(12) United States Patent
Vetter

(10) Patent No.: US 7,296,440 B2
(45) Date of Patent: Nov. 20, 2007

(54) DEVICE AND METHOD FOR MELTING GLASS

(75) Inventor: Johannes Vetter, Meerbusch (DE)

(73) Assignee: Messer Griesheim GmbH (DE)

( * ) Notice: Subject to any disclaimer, the term of this patent is extended or adjusted under 35 U.S.C. 154(b) by 483 days.

(21) Appl. No.: 10/433,695

(22) PCT Filed: Nov. 30, 2001

(86) PCT No.: PCT/EP01/14023

§ 371 (c)(1),
(2), (4) Date: Oct. 21, 2003

(87) PCT Pub. No.: WO02/46110

PCT Pub. Date: Jun. 13, 2002

(65) Prior Publication Data

US 2004/0216490 A1   Nov. 4, 2004

(30) Foreign Application Priority Data

Dec. 7, 2000 (DE) ................................ 100 60 728

(51) Int. Cl.
*C03B 5/16* (2006.01)
(52) U.S. Cl. .................. 65/134.4; 65/134.6; 65/2; 65/DIG. 16
(58) Field of Classification Search ............... 65/134.4, 65/134.6, 2, DIG. 16
See application file for complete search history.

(56) References Cited

U.S. PATENT DOCUMENTS 5,548,611 A * 8/1996 Cusick et al. .................. 373/18
5,599,182 A * 2/1997 Andrews et al. ............ 432/158

* cited by examiner

*Primary Examiner*—Mark Halpern
(74) *Attorney, Agent, or Firm*—Connolly Bove Lodge & Hutz

(57) ABSTRACT

When waste glass that is strongly laden with organic impurities is melted, the organic constituents present in the melt give rise to so-called "black hearts" which can no longer be eliminated in a subsequent refining process, thus impairing the quality of the glass. According to the invention, gas nozzles for introducing oxygen are installed in the area of the inlet opening of a melting unit thermally connected to a combustion chamber. This allows a targeted oxidation of the organic constituents, which are then exhausted in the form of exhaust gas. With the invention, even highly contaminated waste glass such as, for instance, glass fibers, can be returned to the production process.

4 Claims, 1 Drawing Sheet

DEVICE AND METHOD FOR MELTING GLASS

CROSS REFERENCE TO RELATED APPLICATIONS

Not applicable

FEDERALLY SPONSORED RESEARCH OR DEVELOPMENT

Not applicable

PARTIES TO A JOINT RESEARCH AGREEMENT

Not applicable

BACKGROUND OF INVENTION (1) Field of the Invention

The invention relates to a device and to a method to melt glass.

(2) Description of Related Art

A device known from PCT/US9607052 comprises a melting unit in the form of a vertically positioned tube that is provided with a gas-tight and fireproof jacket. The material of which the jacket of the tube is made—normally ceramic material—is a function of the raw material to be melted and it is selected in such a way that reactions between the jacket material and the raw material to be melted are kept to a minimum. The upper end of the tube has an inlet opening through which the raw material is fed. An outlet opening that serves to discharge the melt is located in the lower section.

The prior-art melting unit is concentrically accommodated in an insulated steel casing. The annular space formed between the insulation of the casing and the ceramic tube constitutes the combustion chamber in which the heat needed for the melting process is generated by burning a gas, preferably natural gas. Thus, the material to be melted is fired indirectly. The exhaust gases that are formed during the combustion process are carried off via an exhaust gas line that exits the combustion chamber, so that the gases do not come into contact with the melt or with the raw material. Consequently, the melt removed from the melting unit contains a considerably lower fraction of inorganic impurities than the melt of conventional tank melting processes.

However, when waste glass—of the type found, for example, in mineral fiber production—that is strongly laden with organic impurities is melted, the organic constituents present in the melt give rise to so-called black hearts which can no longer be eliminated, even in a subsequent refining process.

BRIEF SUMMARY OF THE INVENTION

Therefore, the objective of the present invention is to create a device to melt glass as well as to propose a corresponding method to reduce contamination of the melt caused by organic inclusions.

Thus, with the device according to the invention, the material fed into the melting unit is exposed to a reactive gas, for instance, oxygen, coming from at least one gas nozzle and/or gas lance. As a result, organic impurities present in the melting material are oxidized.

In a preferred embodiment of the invention, the melting unit is arranged vertically, whereby the inlet opening for the material to be melted is located in an upper area while the outlet opening for the melt is located in a lower area of the melting unit. The area beyond the inlet opening defines a headspace into which the gas outlet opening of the gas nozzle and/or gas lance opens. With this configuration, the material to be melted is already exposed to oxygen before and during the liquefaction. In this manner, even organic impurities that are partially or completely covered by glass in the material to be melted can be reliably oxidized.

In order to ensure a uniform exposure to oxygen, several gas lances and/or gas nozzles are arranged at regular angular distances around the inlet opening, or else a gas nozzle that extends essentially concentrically in the headspace is provided with several gas outlet openings arranged at regular angular distances.

It has also proven to be advantageous to have such a configuration that the distance between a gas outlet opening of each gas nozzle or gas lance that opens into the headspace and an appropriate melting mirror is adjustable.

In this manner, the distance between the opening of each gas lance or gas nozzle and an appropriate melting mirror can be varied, as a result of which an altogether optimal flow profile can be achieved in the headspace for the combustion of the reactive gas that is fed in.

Advantageously, the space of the melting unit is enlarged in the area of the headspace. This means that a larger volume of material to be melted can be accommodated, thus increasing the period of time during which the material is exposed to oxygen.

A particularly advantageous arrangement is one in which a gas purification device is in flow-connection with an exhaust gas line by means of which combustion gases can be exhausted from the melting unit. In this case, the headspace can also be employed as a refiring chamber for purposes of getting rid of carbon monoxide, dioxins, furans and the like.

Continuous operation of the device according to the invention can be ensured by installing a suitable lock arrangement upstream from the inlet opening of the melting unit. This makes it possible to prevent heated oxygen-rich gas from escaping from the melting unit into the environment.

Thus, with the method according to the invention, substances that are fed into a melting unit and then melted under the effect of the heat generated by a heating device that is thermally connected to the melting unit are exposed to a reactive gas, for instance, oxygen, before or during the melting procedure. Especially organic impurities are oxidized by the fed-in gas and these can then be carried off in gas form. Consequently, the melt thus formed contains no such impurities or else a much smaller fraction than with conventional methods.

Advantageously, the reactive gas is fed in an atmosphere that is shielded from the outside air. In this manner, the reactive gas can especially be prevented from escaping into the outside air or constituents of the outside air can be prevented from getting into the melting unit.

In a further improved embodiment, the feed of reactive gas into the melting unit can also be used to eliminate harmful components of the fed-in materials, such as carbon monoxide, dioxins and furans, by means of combustion.

BRIEF DESCRIPTION OF THE DRAWING

An embodiment of the invention will be explained in greater detail below with reference to the drawing. The single drawing (FIG. 1) schematically shows a cross section of the structure of a device according to the invention for melting glass.

DETAILED DESCRIPTION OF THE INVENTION

Figure 1:
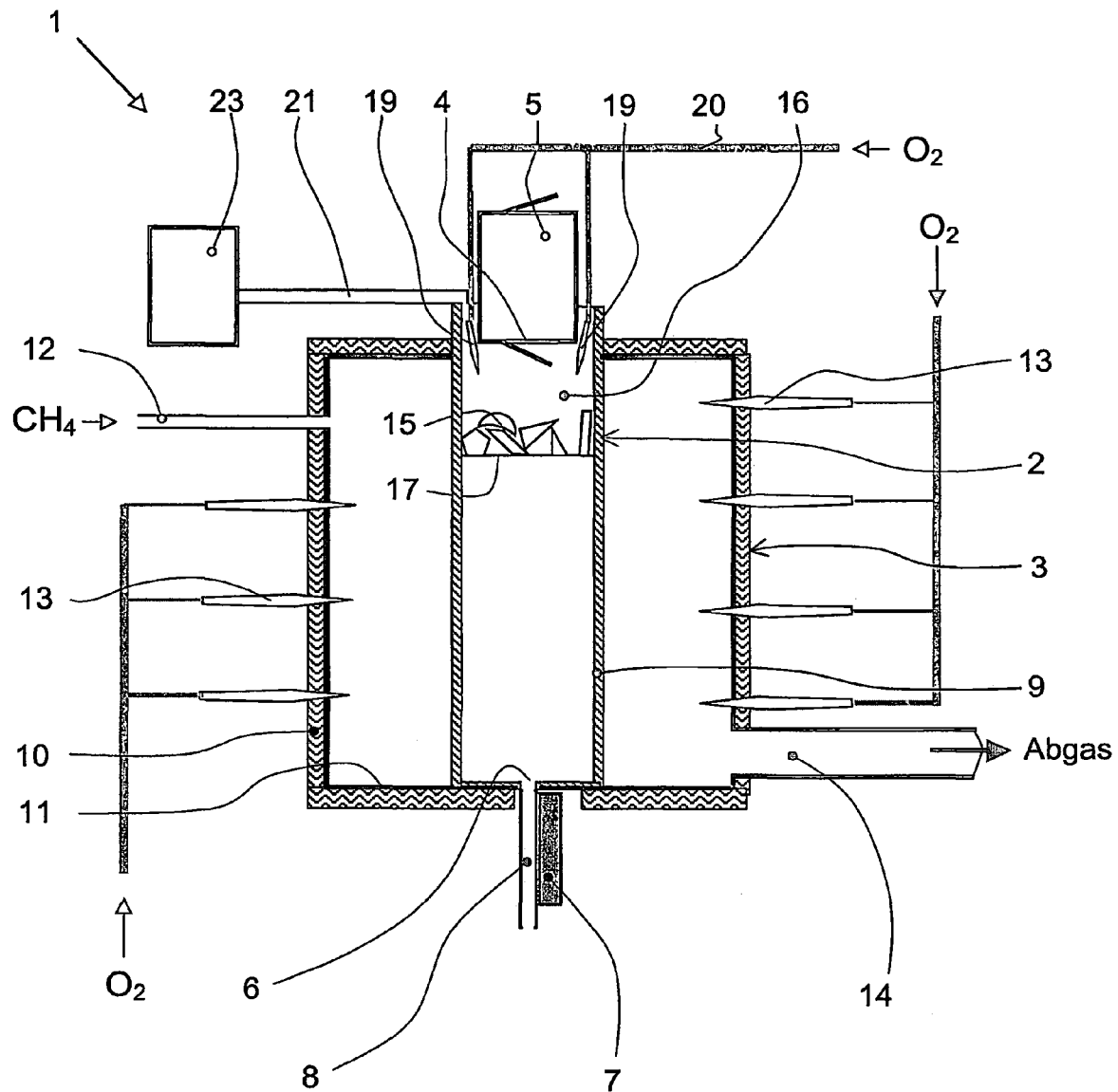

The smelting furnace 1 depicted in FIG. 1 preferably serves to melt and/or vitrify residues—also metallic residues—or to melt old glass, especially to melt types of glass laden with organic impurities.

The smelting furnace 1 comprises an essentially tubular melting unit 2 that is operated in the vertical position and that is concentrically accommodated in an essentially cylindrical combustion chamber 3. On its upper end, the melting unit 2 has an inlet opening 4 through which raw material to be melted is fed. In order to ensure continuous operation of the smelting furnace 1, there is a lock arrangement upstream from the inlet opening 4. New raw material 15 can be continuously fed in through the lock arrangement 5 without causing any lasting disturbance of the thermal or chemical conditions inside the melting unit 2 caused by the penetration of outside air or the like. To the side of the lock arrangement 5, there are means to feed oxygen into the melting unit, an explanation of which will be given below.

On its lower section, the melting unit 2 has an outlet opening 6 that serves to discharge the melt formed in the melting unit 2. On the outlet opening 6, there is an outlet nozzle 8 made of a material that conducts heat well and that is chemically inert such as, for instance, platinum, said nozzle being thermally connected to a heating device 7. By heating the outlet nozzle 8, it can be ensured that the material present inside the outlet nozzle 8 is in a molten state, that is to say, in a flowable state.

The wall 9 of the melting unit 2 consists of a heat-resistant and gas-tight material, for example, a ceramic or metallic material. The material employed here is determined as a function of the type and composition of the substance to be melted. In particular, the material of the wall 9 should be such that, if at all possible, it does not react with the melt that has formed inside the melting unit 2.

A fuel feed line 12 for gaseous fuels, for instance, natural gas, as well as a plurality of injection nozzles 13 for oxygen pass through the wall 11 of the combustion chamber 3, which is provided with an insulating layer 10. The injection nozzles 13 are arranged in a circular pattern at regular angular distances and in several rows at intervals one above the other. A gas exhaust line 14 is provided in order to carry off the exhaust gas formed during the combustion. The fuel fed in via the fuel feed line 12 is burned with the oxygen fed in via the injection nozzles 13. Here, the quantity of oxygen fed in from the injection nozzles 13 of one row can be set individually, whereby a total oxygen amount that corresponds to the stoichiometric ratios is fed in. This approach makes it possible to set a temperature profile that is advantageous for the melting process throughout the melting unit 2.

When the smelting furnace 1 is in operation, raw material 15 is fed into the melting unit 2, and said raw material is melted by the heat generated in the combustion chamber 3, up to the height of a melting mirror 17. Ideally, the melting mirror is located at about two-thirds of the total height of the melting unit 2. Here, the headspace 16 defined by the space between the inlet opening 4 and the melting mirror 17 is partially or completely filled with raw material 15 that is in the process of being melted, in other words, it still contains solid constituents. The headspace 16 is charged with oxygen that is injected by means of oxygen lances 19 connected to an oxygen source 20. The oxygen lances 19 are concentrically arranged at regular angular distances around the lock arrangement 5 and their front section protrudes into the headspace 16 by a specific, but adjustable, distance. The space between the oxygen lances 19, the lock arrangement 5 and the wall 9 of the melting unit 2 is sealed gas-tight. Due to the injected oxygen as well as the heat conducted into the headspace 16 by means of thermal combustion from the combustion chamber 3 into the melting unit 2, organic impurities of the raw material 15 are burned quickly and reliably, whereby the above-mentioned adjustability of the temperature profile along the melting unit 2 as well as the depth with which the oxygen lances 19 penetrate into the headspace 16 make it possible to establish conditions that are optimal for the combustion. Even impurities that are harmful to health or to the environment such as, for instance, carbon monoxide, dioxins, furans and the like can be eliminated in this manner through combustion in the headspace 16. The combustion exhaust gas formed in this process is carried off via an exhaust gas line 21 and conveyed to a gas-purification device 23, for example, a filter installation, and then finally released into the atmosphere in purified form.

The smelting furnace 1 is compact and can be flexibly employed. It also makes it possible to recycle waste glass that is formed during the production of mineral fibers. With these materials, the additives, which consist primarily of organic material, such as sizing agents, binders or adhesives, can only be separated from the glass by means of conventional methods involving so much effort that is hardly economically feasible. These substances are burned virtually reside-free when glass is melted in the smelting furnace 1 of the melting unit 2.

By separating the melting and combustion chambers, a simple and low-cost insulation compound can be chosen for the insulating layer 10 of the combustion chamber 3. Since it is also the case that the exhaust gas from the combustion chamber 3 does not come into contact with the melt in the melting unit 2, almost 100% of it consists of carbon dioxide and water vapor when natural gas is burned. The smelting furnace 1 can be employed in a continuous operation or in a batch operation and it is particularly well-suited as a complement to conventional tank melting processes.

LIST OF REFERENCE NUMERALS 1 smelting furnace
2 melting unit
3 combustion chamber
4 inlet opening
5 lock arrangement
6 outlet opening
7 heating device
8 outlet nozzle
9 wall (of the melting unit)
10 insulating layer
11 wall (of the combustion chamber)
12 fuel feed line
13 injection nozzle
14 gas exhaust line
15 raw material
16 headspace
17 melting mirror
18 -
19 oxygen lances
20 oxygen source
21 exhaust gas line
22 -
23 gas-purification device

The invention claimed is:

1. A method to melt glass, in which substances are fed into a melting unit and then melted under the effect of the heat generated by a heating device that is thermally connected to the melting unit and then conveyed in liquid form to a further processing operation, characterized in that the fed-in substances in the melting device are exposed to a reactive gas before or during the melting procedure, while the fed-in substances still contain solid constituents, wherein the heating device is a combustion chamber, and wherein the reactive gas is an oxidizing gas.

2. The method according to claim 1, characterized in that the reactive gas is fed in an atmosphere that is shielded from the outside air.

3. The method according to claim 2, characterized in that the feed of reactive gas into the melting unit eliminates harmful components of the material being melted, by means of combustion.

4. The method according to claim 3, characterized in that the harmful components eliminated are carbon monoxide, dioxins and furans.

* * * * *